United States Patent [19]

Eadow-Allen

[11] 4,059,925
[45] Nov. 29, 1977

[54] MACHINE FOR FORMING A CURVED SURFACE ON A WORKPIECE

[75] Inventor: Stuart Eadow-Allen, Birmingham, England

[73] Assignee: Dollond & Aitchison (Services) Limited, Birmingham, England

[21] Appl. No.: 652,764

[22] Filed: Jan. 27, 1976

[51] Int. Cl.² .................. B24B 13/00; B24B 17/02
[52] U.S. Cl. .................. 51/100 R; 51/272; 90/58 C
[58] Field of Search .................. 51/35, 100 R, 101 R, 51/101 LG, 105 LG, 106 LG, 93, 50 PC, 272; 82/14 R; 90/20, 21 A, 21 D, 58 C

[56] References Cited

U.S. PATENT DOCUMENTS

| 1,286,032 | 11/1918 | Laisne | 51/100 R |
|---|---|---|---|
| 2,203,979 | 6/1940 | Blood | 51/272 X |
| 2,333,985 | 11/1943 | Clark | 51/100 R |
| 2,872,853 | 2/1959 | Hoern | 51/35 X |
| 3,012,379 | 12/1961 | Kuhlman | 51/284 X |
| 3,239,967 | 3/1966 | Volk | 51/100 R |
| 3,251,157 | 5/1966 | Clark | 51/100 R |
| 3,900,971 | 8/1975 | Brueck | 51/100 |
| 3,913,274 | 10/1975 | Raiford | 51/106 LG |

*Primary Examiner*—Al Lawrence Smith
*Assistant Examiner*—Nicholas P. Godici
*Attorney, Agent, or Firm*—Owen, Wickersham & Erickson

[57] ABSTRACT

A machine for cutting material from a lens blank to form a curved surface has a rotatable cutting wheel and a chuck for supporting the blank. The chuck is mounted for movement in three mutually-orthogonal directions relative to the cutting wheel and respective motors are provided for displacing the chuck in two of these directions to cause the cutting wheel to traverse the surface to be formed on the blank. Two templates and respective followers are provided for controlling movement of the chuck in the third direction in accordance with movement in the first and second directions. The position of the chuck relative to the follower elements can be adjusted to enable a lens with a selected thickness to be formed and one of the follower elements can be adjusted to enable different curvatures to be obtained from a single template.

10 Claims, 4 Drawing Figures

MACHINE FOR FORMING A CURVED SURFACE ON A WORKPIECE

BACKGROUND OF THE INVENTION

This invention relates to a machine for forming on a workpiece a curved surface. The invention has been developed primarily for use in the manufacture of optical lenses, but may also be applied to machines for use in other cutting operations, for example in the formation of a surfacing tool for an optical lens.

The curved surfaces of optical lenses are at present generally formed by cylindrical cutting tools. The cylindrical tool is supported with its axis inclined at an acute angle to the axis of the lens blank and the tool is rotated about its own axis to perform the cutting action and is traversed across the surface of the blank. The curvature of the surface formed on the lens blank by the tool is dependent upon the diameter of the cylindrical tool and also upon the angle at which the axis of the tool is inclined to the axis of the blank. By suitable adjustment of the angular relation between the tool and blank, one tool can be used to cut surfaces having different curvatures. However, the range of curvatures which can be cut with a single tool is severely limited. This limits the usefulness of an individual machine by means of which the cutting operation is carried out. In order to cut surfaces having curvatures outside the range which can be achieved by one cutting tool, that tool can be replaced by another tool of different diameter, but such change of cutting tools involves re-setting the machine which occupies several hours of highly skilled labour. A further disadvantage of the procedure hereinbefore mentioned which is generally used for cutting the curved surfaces on optical lenses is that the accuracy with which the shape of the surface produced conforms to the required shape is not high and varies from one part of the surface to another, the accuracy being greatest in a central region around the optical axis of the lens produced and decreasing with distance away from the axis. Also, the accuracy is greater for surfaces of small curvature and is even less satisfactory for surfaces of severe curvature. These inaccuracies arise partly from the technique of using a cylindrical cutting tool with its axis inclined to the optical axis of the lens and partly from wear of the cutting tool.

SUMMARY OF THE INVENTION

It is an object of the present invention to provide a machine for cutting a curved surface on a lens blank which reduces or avoids one or more of the foregoing disadvantages.

According to the invention we provide a machine comprising a workpiece carrier, a tool carrier, the workpiece carrier and the tool carrier being mounted for universal translation relative to each other, drive means for causing relative movement of the carriers in both a first direction and a second direction transverse to said first direction and guide means for so constraining relative movement of the carriers in a third direction in accordance with said relative movement in the first and second directions that a cutting tool, when such tool is carried by the tool carrier, describes a curved surface of predetermined form when the tool carrier is moved relative to the workpiece carrier.

By the term "universal translation" we mean movement from one point or position to any other selected point or position within a limited volume of space. Although the workpiece carrier and tool carrier are preferably mounted for relative reciprocation along three mutually-orthogonal rectilinear paths, other arrangements which provide for relative universal translation may be used. For example, said first direction may be along a circular path, said second direction may extend radially of the circular path and said third direction may be perpendicular to the plane of the circular path.

The accuracy with which the surface produced conforms to the required shape depends upon the accuracy with which the guide means conforms to the required shape. The guide means may include elements which have a shape related to the shape of the surface to be formed on the workpiece and which can readily be exchanged for further elements, such elements being adapted to produce respective different shapes of the surface formed on the workpiece. The guide means can readily be arranged to maintain a selected degree of accuracy over the entire surface which is formed on the workpiece.

The guide means preferably includes two template elements and respective follower elements associated therewith, one template element co-operating with its associated follower element to control relative movement of the carriers in said third direction in accordance with movement in said first direction and the other template element co-operating with its associated follower element to control relative movement of the carriers in said third direction in accordance with movement in said second direction. With this arrangement, each template element can be of relatively simple form, for example curved in a single direction only.

The template elements may each be adapted to limit relative movement of the workpiece support and tool carrier in said third direction, the guide means further including biasing means for biasing the workpiece support and tool carrier in the third direction to a relative limit position defined by the template elements.

Alternatively, the template elements and follower elements may be adapted to maintain the workpiece support and tool carrier in a predetermined relative position in said third direction dependent upon their relative position in the first and second directions.

BRIEF DESCRIPTION OF THE DRAWINGS

One example of the invention is shown in the accompanying drawings where.

DETAILED DESCRIPTION

Figure 1:
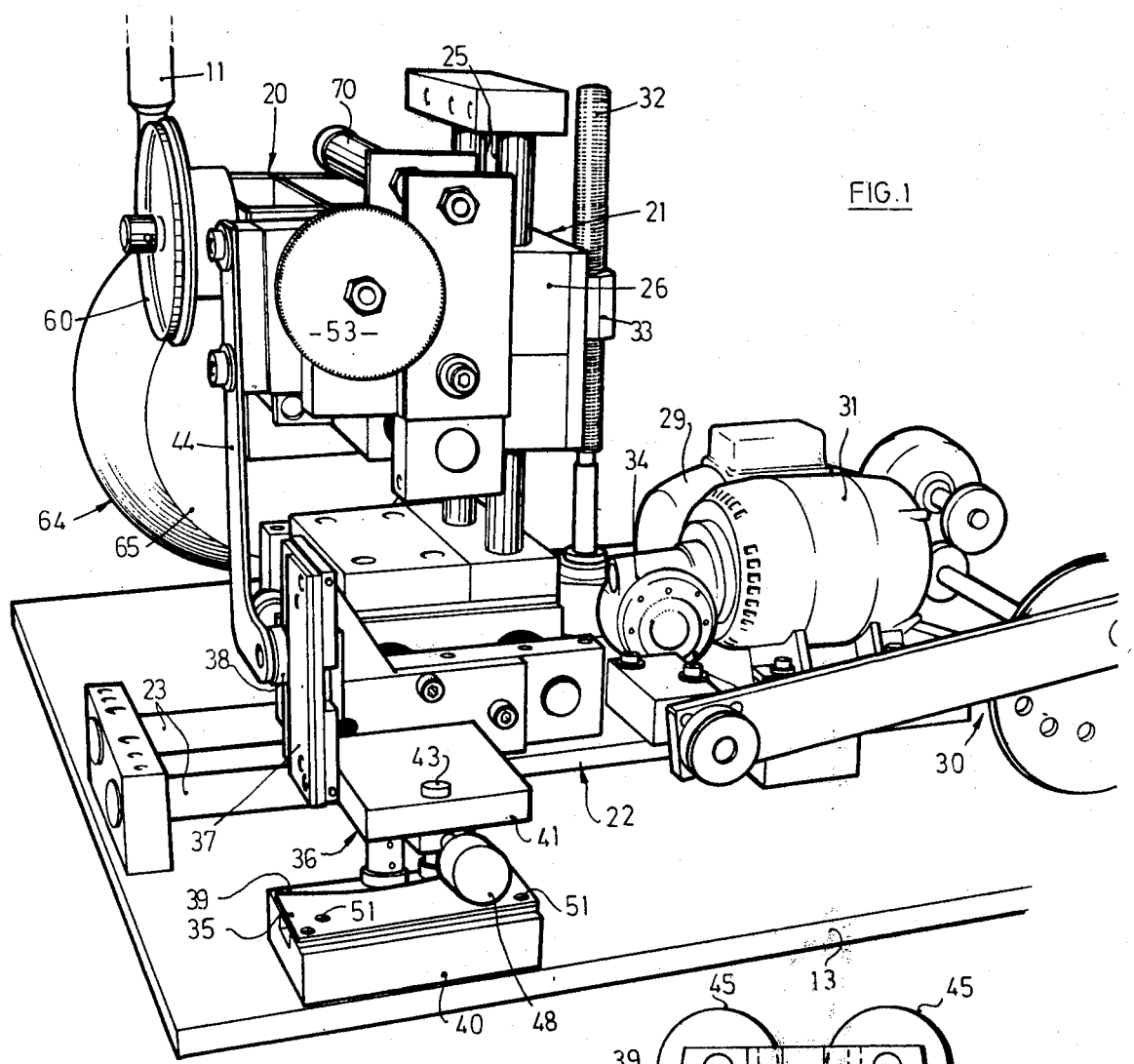
FIG. 1 is a perspective view of a machine in accordance with the invention from above and the rear, the relative positions of components of the machine corresponding to a position of a movable workpiece carrier near to the limit of an upward stroke of the carrier and part-way along a horizontal stroke of the carrier.

The machine illustrated is intended for forming a curved surface on a lens blank. For cutting material from the lens blank there is provided a suitable cutting tool which, in the illustrated example, is a wheel 10. The wheel has a part-spherical peripheral face which may be coated with diamond powder or some other hard material. The cutting wheel is carried on a spindle 11 for rotation about a vertical axis 12 which is fixed with respect to a base 13 of the machine, the spindle being carried by suitable bearings contained with a housing 14. An electric motor 15 is provided for driving the spindle 11 and is coupled thereto by a belt and pulley drive 16 (not shown in FIG. 1).

The lens blank 17 is mounted on a metal pallet 18 by a blocking medium. The machine includes a workpiece carrier in the form of a chuck 19 for releasably gripping the pallet. The chuck is mounted for universal translation relative to the cutting wheel spindle 11. The chuck is secured on a first carriage 20 which is mounted on a second carriage 21 for sliding movement forwardly and rearwardly relative to the second carriage. The second carriage is itself mounted on a third carriage 22 for movement upwardly and downwardly relative to the third carriage which in turn is mounted on the base 13 for horizontal sliding movement laterally of the machine. The respective directions of movement of the carriages 20, 21 and 22 are mutually orthogonal.

Figure 3:
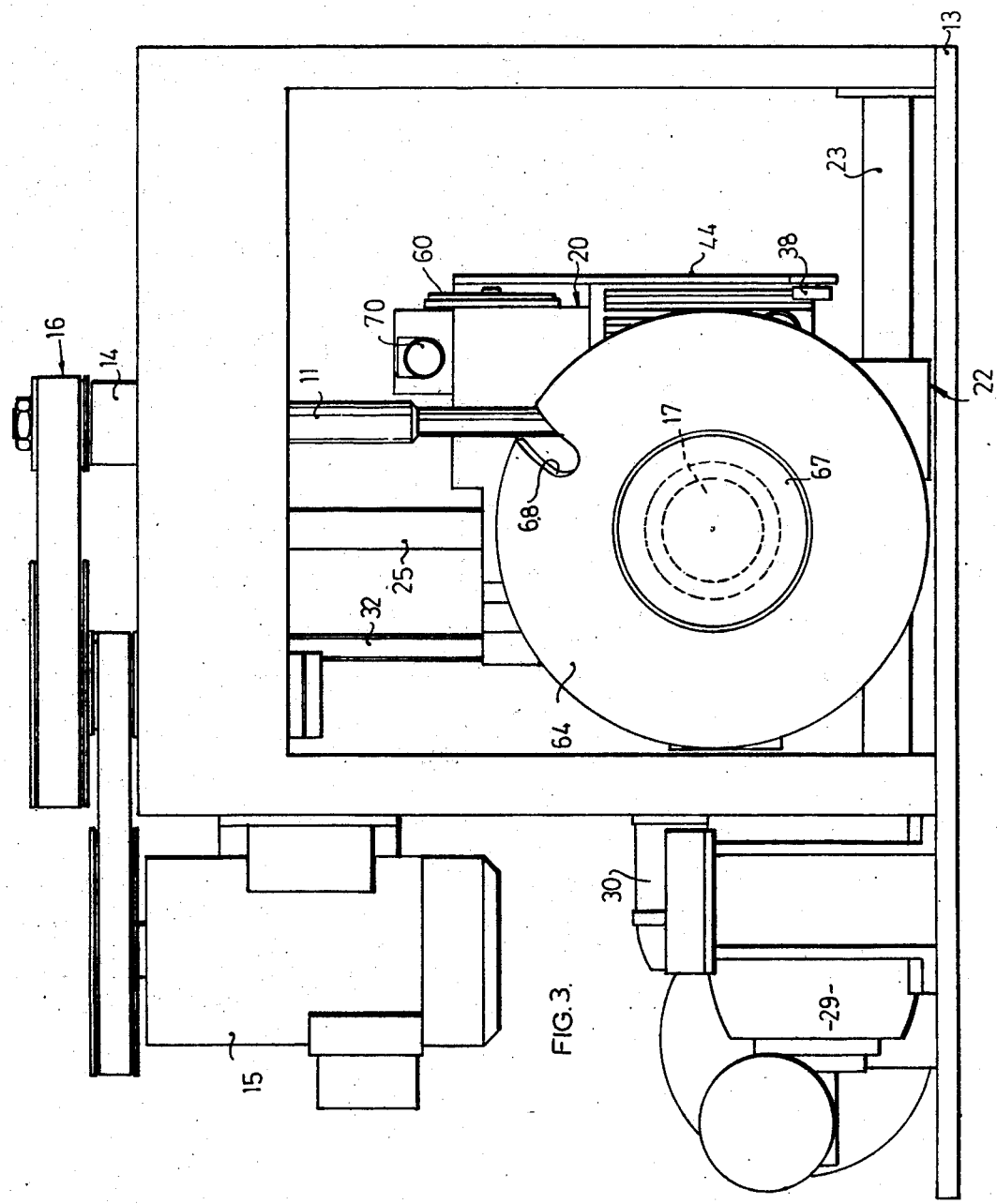
FIG. 3 shows a front elevation of the machine in a condition in which the workpiece support is at the lower limit of its vertical stroke and at one extremity of its horizontal stroke.

There are secured on the base 13 a pair of bars 23 which extend side-by-side from left to right, when the machine is viewed from the front as in FIG. 3. The carriage 22 is provided with bearings 24 which slidably engage the bars 23 and guide the carriage 22 for movement along the bars. A further pair of bars 25 is secured to the carriage 22, these bars extending vertically. The carriage 21 is provided with a bearing 26 which slidably engages with the bars 26 and guides the carriage 21 for vertical movement. Further bearings 27 are secured on the carriage 21, these bearings engaging horizontal bars 28 to guide same for sliding movement forwardly and rearwardly. The first carriage 20 is mounted on the bars 28.

Drive means is provided for reciprocating the carriage 22 along the bars 23 and for reciprocating the carriage 21 upwardly and downwardly on the bars 25. The drive means comprises a first electric motor 29 having a rotatable output shaft which is coupled by an adjustable crank and connecting rod mechanism 30 with the carriage 22. The motor 29 is secured on the base 13. The drive means further comprises a vertical lead screw 32 which is anchored against displacement relative to the carriage 22 but is free to rotate relative thereto. The lead screw is engaged with a nut 33 secured to the carriage 21. An electric motor 31 carried on the carriage 22 is coupled with the lead screw 32 by a suitable gearbox 34 to enable the lead screw to be driven.

The machine further comprises guide means for controlling movement of the first carriage 20 along the bars 28 in accordance with movement of the carriages 21 and 22. The guide means includes two template elements and respective follower elements associated therewith. One template element, 35, and the associated follower element 36, limit the rearward displacement of the chuck 19 in accordance with the position of the carriage 22 along the bars 23 and the other template element 37, and the associated follower element 38, control rearward displacement of the chuck 19 in accordance with the position of the carriage 21 along the vertical bars 25.

The template 35 is in the form of a flat plate having an operative edge 39. This edge may be rectilinear, convex or concave, depending upon the particular shape of the surface which is to be formed on the lens blank 17. The plate is releasably secured on a support 40 with the plate horizontal and its operative edge 39 facing forwardly of the machine. The support 40 is rigidly secured to the base 13. The follower element 36, which will be described hereinafter, is mounted on a mounting piece 41 to which the template element 37 is releasably secured. The mounting piece is carried on the carriage 22 for sliding movement relative thereto forwardly and rearwardly but is constrained to move to left and right with the carriage 22. The follower element 36 is thereby caused to traverse along the operative edge 39 of the template element 35. The template element 37 is also in the form of a flat plate and has an operative edge 42 which may be rectilinear, concave or convex. The follower element 38, which is in the form of a roller engages with the edge 42 of the template element 37. This roller is carried by a follower arm 44 which is connected by an adjustable motion transmitting structure, to be described hereinafter, to the first carriage 20. It will be seen that the roller 38 is caused to ascend and descend with the carriage 21 and that the roller traverses the edge 42 when such movement occurs. It will further be seen that forward and rearward movement of the foller 38 which results from traversing of either of the follower elements along a curved operative edge of an associated template element causes the first carriage 20 also to move forwardly and rearwardly.

Turning now to the structure of the follower element 36, this comprises two contact elements 45, each in the form of a roller, which are spaced apart along the operative edge 39 of the associated template element. The rollers 45 are pivotally mounted on a common connecting element 46 which has a rectilinear guideway extending in a direction perpendicular to a line joining the respective centres of rotation of the rollers 45. A slide can be displaced along this guideway by a screw and nut mechanism, the screw of which is indicated at 48. The screw and nut mechanism is provided with visual scales which are similar to those provided on a micrometer and indicate with considerable precision the position of the slide 47 relative to the connecting element 46. The slide 47 includes a pivot 43 by means of which the slide is connected to the mounting piece 41.

If the centre of the pivot connection 43 between the slide 47 and the mounting piece 41 is directly aboe the operative edge 39 of the associated template element 35, then, if the carriage 22 is reciprocated along the bars 23, the mounting piece 41 will be moved along an arc having a radius of curvature equal to that of the edge 39 of the template element. The chuck 19 will be moved along an arc having the same radius of curvature. The radius of curvature of the surface formed on the lens blank 17 by the cutting wheel 10 when the chuck 19 is moved horizontally along an arc will depend upon the radius of the cutting wheel and upon the radius of curvature of the arc along which the chuck is moved. The pivot connection between the slide 47 and mounting piece 41 can be off-set rearwardly with respect to the edge 39 to vary the radius of curvature of the arcs along which the mounting piece 41 and the chuck 19 are moved. Thus, variations in the radius of the cutting wheel 10 caused by wear can be compensated for by adjustment of the position of the slide 47 relative to the connecting element 46. Furthermore, adjustment of the slide to different positions relative to the connecting element enables the machine to form on workpieces curved surfaces having respective different radii of curvature, without changing the template element 35.

It will be noted that the position of the slide 47 relative to the connecting element 46 can be adjusted steplessly. Accordingly, a single template element 35 can be used to produce surfaces having radii of curvature with any selected value within a predetermined range, the extent of which is determined by the limits of adjustment of the slide relative to the connecting element. A set of template elements 35 is provided, these template elements having operative edges 39 with respective different radii of curvature such that there can be produced on a lens blank a surface having any radius of curvature which might be required in a spectacle lens. Some of the template elements are concave and others are convex. One template element has a rectilinear operative edge 39 for producing on a lens blank surfaces which are not curved in the horizontal direction, as the lens blank is supported in the machine.

A similar set of template elements 37 is provided for controlling the curvature of the surface produced on the lens blank in the vertical direction, as the blank is mounted in the machine. Only surfaces with a limited number of different curvatures in the vertical direction can be produced by the example of apparatus shown in the accompanying drawings, but this is not found to be disadvantageous as the ability to form the surface with any required curvature in the horizontal direction enables a lens of any required power to be produced. If required, a follower element identical with the follower element 36 may be pivotally mounted on the follower arm 44 in place of the roller 38.

It will be appreciated that if it is required to produce on a lens blank a surface, the cross-section of which is a curve other than an arc of a circle, this can be achieved by the machine illustrated, provided that a template element with an appropriately curved operative edge is available.

If the facility for forming a surface with any required curvature in the horizontal direction is not required, the follower element 36 may be a single roller, similar to the follower element 38. Such roller may have a radius equal to that of the cutting wheel 10, in which case the radius of curvature of the surface formed on the lens blank will be equal to the radius of curvature of the operative edge 39 of the template element 35.

All of the template elements are preferably so formed that when they are fitted either to the support 40 or to the mounting piece 41, the centres of their operative edges lie at the same position. Each template element is conveniently formed with two apertures which engage over a pair of locating pins 50 on the support 40 or a pair of locating pins 51 on the mounting piece 41. The template elements may be releasably held in position by magnetic elements.

In order to produce a lens having a predetermined thickness at its optical centre, it is desirable for the structure which transmits motion from the follower arm 44 to the first carriage 20 to be adjustable, so that the position of the chuck 19 relative to the follower element 38 can be adjusted forwardly and rearwardly. This structure comprises a lead screw 52 which is mounted on the carriage 20 for rotation relative thereto about a horizontal fore-and-aft axis. The lead screw is constrained against displacement relative to the carriage and at one end carries a hand wheel 53 by means of which the structure can be adjusted manually. Adjacent to its upper end, the arm 44 carries a nut which engages with the lead screw 52 so that the arm can be driven forwardly and rearwardly relative to the carriage 20 by rotation of the hand wheel. The arm is further supported by a bush 54 which can slide freely along a shaft 55 which is parallel to the lead screw 52.

Means is provided for indicating the relative position and relative movement of the follower arm 44 and chuck 19. Such indicating means comprises a rack 56 which is secured to the follower arm and projects therefrom parallel to the axis of the lead screw 52 in the forward direction. The rack meshes with a pinion 57 which is rotatable about a horizontal axis and is fast with a relatively large spur gear 58. The spur gear 58 in turn meshes with a smaller spur gear 59, also mounted for rotation about a horizontal axis and carrying a cursor 60. The cursor moves over inner scales 61 and 62 which are stationary with respect to the carriage 20 and over an outer scale 62 which is rotatable relative to the carriage. The inner scales 61 and 62 represent the optical power of the blocked face of the lens blank, one scale representing positive powers and the other scale representing negative powers. The outer sclae 63 is marked to represent the thickness of the lens at its optical centre. The pinion 57, spur gears 58 and 59 and the cursor 60 are all mounted on the first carriage 20.

To collect material which is cut from the lens blank 17 and lubricant and/or coolant which is directed onto the cutting wheel 10 and lens blank, there is provided a housing 64 which substantially encloses the chuck 19, lens blank and cutting wheel. The housing is of part-spherical form and has a flat rear face 65. This rear face is formed with a central aperture in which a bearing 66 is received. The housing is supported from the carriage 20 by this bearing so that the housing is free to rotate about a horizontal axis of the chuck. A further opening is formed in the front of the housing, this opening normally being closed by a door 67.

Figure 4:
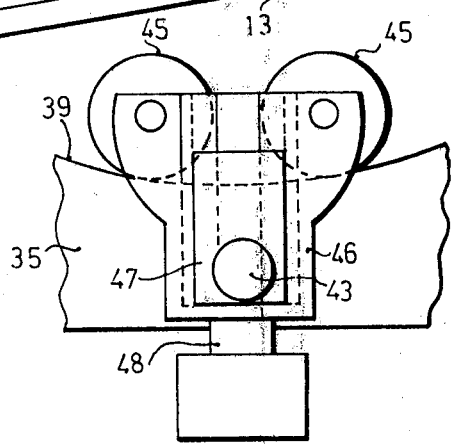
FIG. 4 shows on an enlarged scale a plan view of a template element and an associated follower element of the machine.
Figure 2:
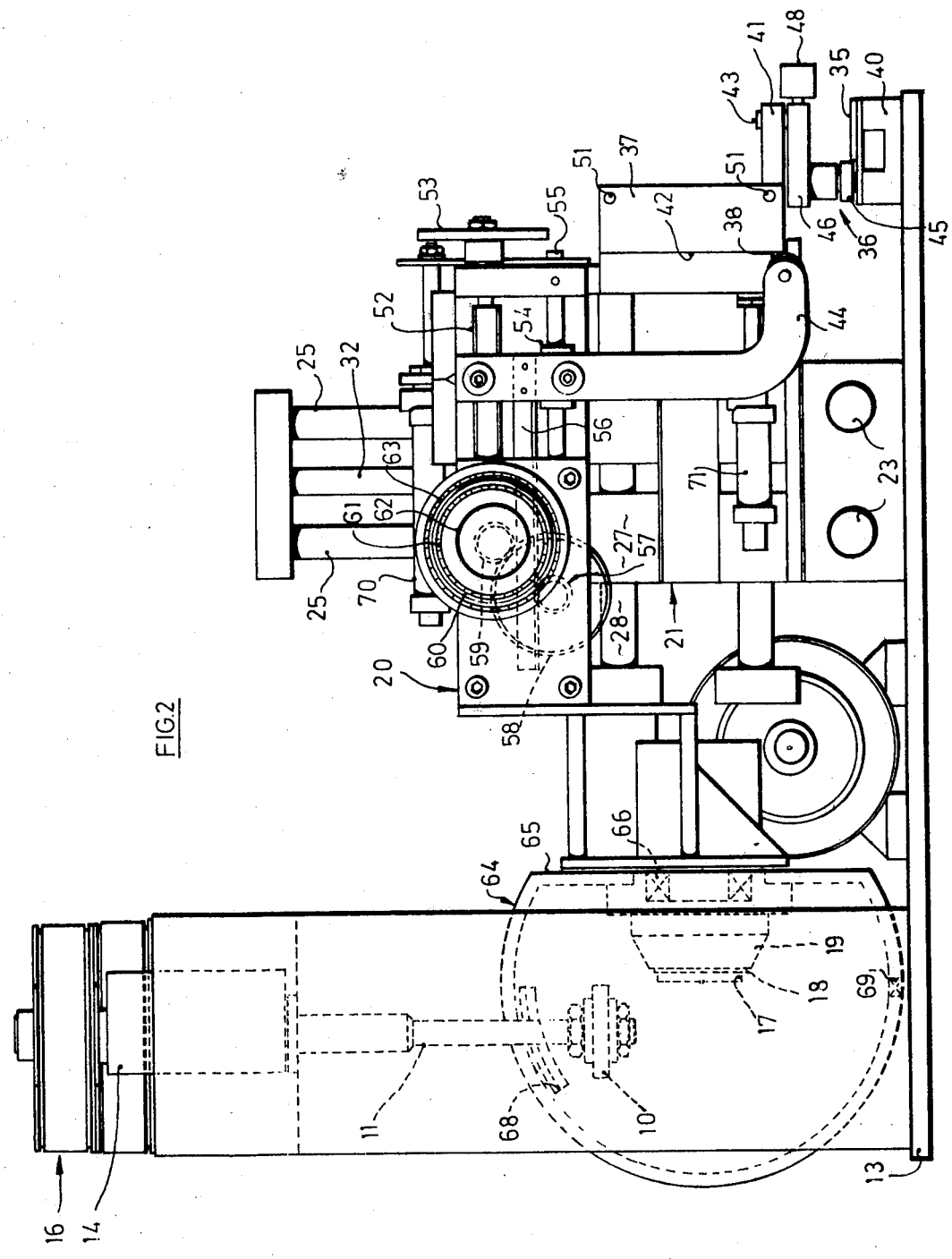
FIG. 2 shows the machine in side elevation with the workpiece carrier at the lower limit of its vertical stroke.

There is further formed in the housing 64 an opening which is offset from the axis of the chuck and is in the form of a slot 68, the length of which extends in a direction from the door 67 towards the rear face 65. This slot has a width such that it can receive the cutting wheel spindle 11 with clearance, even when, as shown in FIG. 4, the slotted part of the housing lies to one side of the chuck. The length of the slot is sufficient to accommodate the full extent of forward and rearward movement of the carriage 20. Vertical movement of the carriage is accommodated by the housing sliding along the cutting wheel spindle 11. Lateral movement of the carriage is accommodated by turning of the housing on the bearing 66. A feed pipe (not shown) for lubricant and/or coolant would also be arranged to enter the housing through the slot 68 and a drain 69 is provided at the bottom of the housing to convey away this fluid and material cut from the lens blank.

Whilst a cutting operation is in progress, the cutting wheel 10 is in pressure contact with the lens blank 17 and this pressure maintains the follower element 36 in contact with the template element 35 and also maintains the follower element 38 in contact with the template element 37. To maintain such contact prior to engagement of the cutting wheel with the lens blank, biasing means is provided for urging the carriage 20 rearwardly. Such biasing means is in the form oof a pneumatic piston and cylinder unit 70. Alternatively, a spring could be provided.

Some lenses are required to exhibit a prism effect. One way in which such lenses are produced at the present time is by placing a wedge-shaped insert between a pallet on which the lens is carried and a chuck or other member of a machine which grips and locates the pallet, the machine then cutting material from the lens blank to form a surface of the required curvature. This procedure has the disadvantage that the lens is displaced axially by the wedge-shaped insert and the relative positions of the cutting tool and chuck must be adjusted according to the thickness of the insert. In the machine illustrated in the accompanying drawings, such adjustment can be carried out readily by means of the hand wheel 53. Alternatively, to avoid the necessity for such adjustment, there may be provided a set of template elements having respective operative edges which are tilted with respect to a line joining the apertures which receive the locating pins 50 or 51.

When a lens blank is to be cut by means of the machine illustrated, template elements which correspond to the prescribed curvature of the surface to be formed on the lens are fitted onto the support 40 and mounting piece 41 respectively. The osition of the slide 47 relative to the connecting element 46 is adjusted as necessary. The position of the arm 44 relative to the chuck 19 is adjusted, as necessary, by means of the hand wheel 53. By rotation of the hand wheel, the cursor is set to indicate the power of the blocked face of the lens blank. This effects an adjustment which compensates for any curvature of the blocked face of the blank. It will be appreciated that a blank is normally blocked in a position relative to the metal pallet, in which points on the face of the blank which lie 25 mm from the optical centre of the face are spaced 7 mm forwardly from the front face of the pallet. The position of the centre of the face relative to the pallet will therefore depend on the curvature of the face. A further adjustment, corresponding to the required thickness of the finished lens, is then made by turning the outer scale until its origin coincides with the index mark of the cursor and then turning the cursor to indicate the required thickness on the outer scale.

Adjustable limit switches (not shown) are used to control the traverse of the carriage 21 along the bars 25, in accordance with the diameter of the lens blank which is being cut. When the entire surface of the lens blank has been formed, the carriage 21 may be returned automatically to its initial position. The cutting wheel 10 typically has a radius of 25 mm and a thickness of 20 mm. The radius of curvature of the nose of the wheel may be 25 mm also. By substitution of a different tool for the cutting wheel 10, the machine may be used for polishing the surface formed on the lens.

When adjusting the position of the arm 44 relative to the chuck 19 by means of the hand wheel 53, it may be desired to de-energise the piston and cylinder unit 70, so that this unit does not oppose the required adjustment. In order to maintain proper contact between the template element 35 and the follower element 36, when the unit 70 is de-energised, there may be provided a further piston and cylinder unit 71, which when energised, urges the mounting piece 41 rearwardly relative to the carriage 22. The piston and cylinder units are conveniently energised by compressed air under the control of manually operable valves (not shown).

In a modified form (not shown) of the machine which is illustrated in the accompanying drawings, the guide means comprises, in place of the template elements and follower elements, two stepping motors. These stepping motors have respective output elements which are so coupled to the carriage 20 as to enable the carriage to be moved forwardly and rearwardly by the stepping motors. One stepping motor is provided with signals which are co-ordinated with movement of the carriage 22 along the bars 23 to control the curvature of the surface formed on the lens in the horizontal direction. The other stepping motor is provided with signals coordinated with movement of the carriage 21 along the bars 25 to control curvature of the surface formed on the lens blank in the vertical direction. These control signals are provided by an electronic control device which may have input means capable of reading a lens prescription in punched card or some other form readable by a machine.

I claim:
1. A machine comprising:
   a. a tool carrier,
   b. a carriage mounted for movement relative to the tool carrier,
   c. means for confining movement of the carriage to reciprocation in three manually perpendicular directions
   d. a workpiece carrier secured on the carriage,
   e. drive means for causing movement of the workpiece carrier in both a first of said directions and in a second of said directions said movement in at least the first of said directions being continuous reciprocation and said second of said directions being transverse to said first of said directions and
   f. guide means for so constraining movement of the workpiece carrier in a third of said directions in accordance with said movement in the first and second of said directions that, when the tool carrier is moved and
   a cutting tool is carried by the tool carrier, the cutting tool describes a curved surface of predetermined form on a workpiece carried by the workpiece carrier.
2. A machine comprising:
   a. a workpiece carrier,
   b. a tool carrier, the workpiece carrier and the tool carrier being mounted for universal translation relative to each other,
   c. drive means for causing relative movement of the carriers in both a first direction and a second direction transverse to said first direction, and
   d. guide means for so constraining relative movement of the carriers in a third direction in accordance with said relative movement in the first and second directions that a cutting tool, when such tool is carried by the tool carrier, describes a curved surface of predetermined form when the tool carrier is moved relative to the workpiece carrier, wherein the guide means includes two template elements and respective follower elements associated therewith, one template element for cooperation with its associated follower element to control relative movement of the carriers in said third direction in accordance with movement in said first direction and the other template element for cooperating with its associated follower element to control relative movement of the carriers in said third direction in accordance with movement in said second direction, each of said template elements and the follower element associated therewith being mounted for traverse of the follower element across the template element along a sole path, and e. means provided for preventing traverse of the follower element across the template element along any path other than said sole path.

3. A machine comprising:
a. a workpiece carrier,
b. a tool carrier, the workpiece carrier and the tool carrier being mounted for universal translation relative to each other,
c. drive means for causing relative movement of the carriers in both a first direction and a second direction transverse to said first direction,
d. guide means for so constraining relative movement of the carriers in a third direction in accordance with said relative movement in the first and second directions that a cutting tool, when such tool is carried by the tool carrier, describes a curved surface of predetermined form when the tool carrier is moved relative to the workpiece carrier, wherein the guide means includes two template elements and respective follower elements associated therewith, one template element for cooperation with its associated follower element to control relative movement of the carriers in said third direction in accordance with movement in said first direction and the other template element for cooperation with its associated follower element to control relative movement of the carriers in said third direction in accordace with movement in said second direction, and
e. an adjustable motion-transmitting structure operatively interposed between one of the carriers and one of the template elements and the follower element associated therewith.

4. A machine comprising:
a. a workpiece carrier,
b. a tool carrier, the workpiece carrier and the tool carrier being mounted for universal translation relative to each other,
c. drive means for causing relative movement of the carriers in both a first direction and a second direction transverse to said first direction,
d. guide means for so constraining relative movement of the carriers in a third direction in accordance with said relative movement in the first and second directions that a cutting tool, when such tool is carried by the tool carrier, describes a curved surface of predetermined form when the tool carrier is moved relative to the workpiece carrier, wherein the guide means includes two template elements and respective follower elements associated therewith, one template element for cooperation with its associated follower element to control relative movement of the carriers in said third direction in accordance with movement in said second direction, and
e. one of said follower elements comprising two contact elements and a connecting element connecting the contact elements to each other, the contact elements being arranged for engagement with the associated template element concurrently at spaced positions and the connecting element being pivotally connected to a motion-transmitting structure through which motion is transmitted from the follower element to one of the carriers.

5. Apparatus according to claim 4 wherein means is provided for adjusting the position relative to the contact elements of an axis about which the connecting element can pivot relative to the motion-transmitting structure.

6. Apparatus according to claim 5 wherein said means for adjusting is so formed or constructed as to permit stepless adjustment of the axis.

7. Apparatus according to claim 4 wherein the contact elements are adapted to roll on the template element.

8. A machine according to claim 3 wherein there is associated with the adjustable motion-transmitting structure indicator means for indicating the position of the template elements relative to one of the carriers.

9. A machine according to claim 8 wherein the indicating means includes a scale marked to represent the thickness of a lens to be produced on the machine.

10. A machine comprising:
a. a workpiece carrier,
b. a tool carrier, the workpiece carrier and the tool carrier being mounted for universal translation relative to each other,
c. drive means for causing movement of the carriers in both a first direction and a second direction, transverse to said first direction,
d. guide means for so constraining relative movement of the carriers in a third direction in accordance with said relative movement in the first and second directions that a cutting tool, when such tool is carried by the tool carrier, describes a curved surface of predetermined form when the tool carrier is moved relative to the workpiece carrier and
e. a housing in which the cutting tool and the workpiece are disposed in use, the housing being mounted for rotation about an axis of one of the carriers and having an opening offset from said axis which slidably receives the other carrier.

* * * * *

UNITED STATES PATENT AND TRADEMARK OFFICE
CERTIFICATE OF CORRECTION

PATENT NO. : 4,059,925
DATED : November 29, 1977
INVENTOR(S) : Stuart Eadon-Allen It is certified that error appears in the above-identified patent and that said Letters Patent are hereby corrected as shown below:

Left-hand column of first page, in the heading and in item [75], "Eadow-Allen" should read --Eadon-Allen--.

Column 1, line 40, "from the" should read --from this--.

Column 4, line 47, "aboe" should read --above--.

Column 6, line 22, "sclae" should read --scale--.

Column 6, line 64, "oof" should read --of--.

Column 7, line 21, "osition" should read --position--.

Column 8, line 21, "manually" should read --mutually--.

Column 8, line 61, "cooperating" should read --cooperation--.

Column 10, line 2, after "said" and before "second" insert: --first direction and the other template element for co-operation with its associated follower element to control relative movement of the carriers in said third direction in accordance with movement in said--.

Signed and Sealed this

Eighteenth Day of April 1978

[SEAL]

Attest:

RUTH C. MASON
Attesting Officer

LUTRELLE F. PARKER
Acting Commissioner of Patents and Trademarks